(12) United States Patent
Cheng

(10) Patent No.: US 8,902,583 B2
(45) Date of Patent: Dec. 2, 2014

(54) HOLDING STRUCTURE AND PORTABLE ELECTRONIC APPARATUS THEREWITH

(75) Inventor: Yen-Chang Cheng, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 251 days.

(21) Appl. No.: 13/612,853

(22) Filed: Sep. 13, 2012

(65) Prior Publication Data

US 2013/0135798 A1    May 30, 2013

(30) Foreign Application Priority Data

Nov. 24, 2011    (TW) .............................. 100143094 A

(51) Int. Cl.
*G06F 1/16* (2006.01)

(52) U.S. Cl.
USPC ................... 361/679.55; 248/316.2; 345/179; 403/374.1

(58) Field of Classification Search
USPC ................... 361/679.55; 248/316.2; 345/179; 403/374.1–374.5
See application file for complete search history.

(56) References Cited

U.S. PATENT DOCUMENTS

| | | | |
|---|---|---|---|
| 5,757,681 A * | 5/1998 | Suzuki et al. ................. | 708/107 |
| 5,996,956 A * | 12/1999 | Shawver ..................... | 248/309.1 |
| 6,068,307 A * | 5/2000 | Murphy ........................ | 292/302 |
| 6,295,198 B1 * | 9/2001 | Loh et al. .................... | 361/679.3 |
| 6,386,496 B1 * | 5/2002 | Lai et al. ..................... | 248/309.1 |
| 6,819,557 B2 * | 11/2004 | Lilenfeld ................. | 361/679.56 |
| 7,576,980 B2 * | 8/2009 | Lin .......................... | 361/679.56 |
| 7,796,382 B1 * | 9/2010 | Li ............................. | 361/679.58 |
| 7,938,375 B1 * | 5/2011 | Massegee ...................... | 248/314 |
| 8,081,172 B2 * | 12/2011 | Chikazawa et al. ........... | 345/179 |
| 8,405,641 B2 * | 3/2013 | Tseng .......................... | 345/179 |
| 8,462,488 B2 * | 6/2013 | Tseng ..................... | 361/679.01 |
| 8,737,049 B2 * | 5/2014 | Minaguchi et al. ...... | 361/679.09 |
| 2004/0118743 A1 * | 6/2004 | Yang et al. .................... | 206/701 |
| 2007/0115618 A1 * | 5/2007 | Love ............................ | 361/679 |

FOREIGN PATENT DOCUMENTS

| | | |
|---|---|---|
| TW | M264586 | 5/2005 |
| TW | M415212 | 11/2011 |

OTHER PUBLICATIONS

Office action mailed on Oct. 15, 2013 for the Taiwan application No. 100143094, filing date: Nov. 24, 2011, p. 2 line 2~17 and p. 3 line 5~23.

* cited by examiner

*Primary Examiner* — Lisa Lea Edmonds
(74) *Attorney, Agent, or Firm* — Winston Hsu; Scott Margo

(57) ABSTRACT

A holding structure and a portable electronic apparatus therewith are disclosed. The holding structure includes a mount structure and a movable member. The mount structure includes a constraining portion having an accommodating space and an opening. The movable member includes a carrier having an engaging structure. When an end portion of a pencil object is inserted into the constraining portion from the opening to be accommodated together with the carrier in the accommodating space, the constraining portion constrains deformation of the engaging structure such that the engaging structure is engaged with the end portion. The end portion is therefore hardly extracted out. When the carrier departs from the accommodating space, the engaging structure and the end portion are disengaged. The end portion is therefore easily extracted out. The invention uses structure to constrain deformation, which can provide stable holding strength without any metal spring.

12 Claims, 14 Drawing Sheets

HOLDING STRUCTURE AND PORTABLE ELECTRONIC APPARATUS THEREWITH

BACKGROUND OF THE INVENTION

1. Field of the Invention

The invention relates to a holding structure and a portable electronic apparatus, and especially relates to a holding structure using structure to constrain deformation and a portable electronic apparatus with the holding structure.

2. Description of the Prior Art

As touch technique matures, many current portable electronic apparatuses such as personal digital assistants, tablet computers, smart phones and so on are provided with touch control function. In general, the screen of such apparatus is not large, so images or icons displayed on the screen are small. It is difficult to touch the images or icons precisely only by fingers, which bothers users. Therefore, such apparatus is usually equipped with a touch pen for precise touch operation. In the design for the current products, the touch pen is accommodated by directly inserting into the apparatus casing. The simplest way for holding the touch pen is based on friction force, but the holding effect will decay because of long-term wearing. Therefore, in order to fixedly accommodating the touch pen effectively and for convenience of a user to extract it out or insert it in, in general, a metal spring is disposed in the apparatus casing. The elastic force by the metal spring is used for holding the touch pen to keep it from falling. However, in such structural design, the insertion force and the extraction force are the same, even equip to the force for fixedly folding the touch pen. Under a consideration of extracting out and inserting in easily for users, the elastic force for the extraction and the insertion is not proper to be too large; however, such elastic force may be insufficient for fixing the touch pen. The touch pen may be extracted unexpectedly to be fallen and lost, which is inconvenient to users. In addition, the holding force by the metal spring may decay because of the elasticity fatigue of the metal spring, which makes the above situation worse.

SUMMARY OF THE INVENTION

An objective of the invention is to provide a holding structure, which uses structure to constrain deformation to provide a larger holding force so as to effectively prevent a held object from being fallen unexpectedly.

The holding structure of the invention is used for holding an end portion of an object. The holding structure includes a mount structure and a movable member. The mount structure includes a constraining portion. The constraining portion has an accommodating space and an opening communicating with the accommodating space. The movable member is capable of moving relative to the mount structure. The movable member includes a carrier. The carrier includes an engaging structure for being engaged with the end portion. When the end portion is inserted into the constraining portion from the opening to be accommodated together with the carrier in the accommodating space, the constraining portion constrains deformation of the engaging structure such that the engaging structure is engaged with the end portion. When the carrier departs from the accommodating space, the engaging structure and the end portion are disengaged. Therefore, the holding structure uses structure to constrain the deformation so as to provide a stable holding force, which avoids the problem in the prior art that the holding force by the metal spring decays because of the elasticity fatigue of the metal spring. In principle, the holding force by structural constraint is larger than that by the metal spring, so the holding structure has the effect of providing high holding force. Furthermore, when the carrier is not located in the accommodating space, the engaging structure and the end portion are disengaged, so a user can extract or insert the object in a smaller force. That is, the holding force and the forces for extraction and insertion of the holding structure can be designed individually, so as to meet actual requirements better.

Another objective of the invention is to provide a portable electronic apparatus having the holding structure of the invention. Similarly, the portable electronic apparatus also uses structure to constrain deformation to provide larger holding force, so as to effectively prevent an object which is inserted in the portable electronic apparatus to be held from being fallen unexpectedly.

The portable electronic apparatus of the invention includes a casing, a pencil object, and a holding structure. The casing has an inlet. The pencil object has an end portion. The holding structure is disposed in the casing. The pencil object is capable of being inserted into the casing from the inlet to be held by the holding structure. The holding structure includes a mount structure and a movable member. The mount structure includes a constraining portion. The constraining portion has an accommodating space and an opening communicating with the accommodating space. The movable member is capable of moving relative to the mount structure. The movable member includes a carrier. The carrier includes an engaging structure for being engaged with the end portion. When the end portion is inserted into the constraining portion from the opening to be accommodated together with the carrier in the accommodating space, the constraining portion deformation of the engaging structure such that the engaging structure is engaged with the end portion. When the carrier departs from the accommodating space, the engaging structure and the end portion are disengaged. Similarly, the portable electronic apparatus also uses structural constraint to provide stable holding force, which avoids the problem in the prior art that the holding force by the metal spring decays because of the elasticity fatigue of the metal spring. Furthermore, the portable electronic apparatus can allow flexibility in designing the holding force quite different to the forces of extraction and insertion by the property that the engaging structure and the end portion are disengaged when the carrier is not located in the accommodating space. In addition, in practical product design, a part structure of the holding structure, especially the constraining portion can be formed on the inner wall of the casing, which further improves the capability and stability of the constraining portion constraining the deformation of the engaging structure.

These and other objectives of the invention will no doubt become obvious to those of ordinary skill in the art after reading the following detailed description of the preferred embodiment that is illustrated in the various figures and drawings.

DETAILED DESCRIPTION

Figure 1:
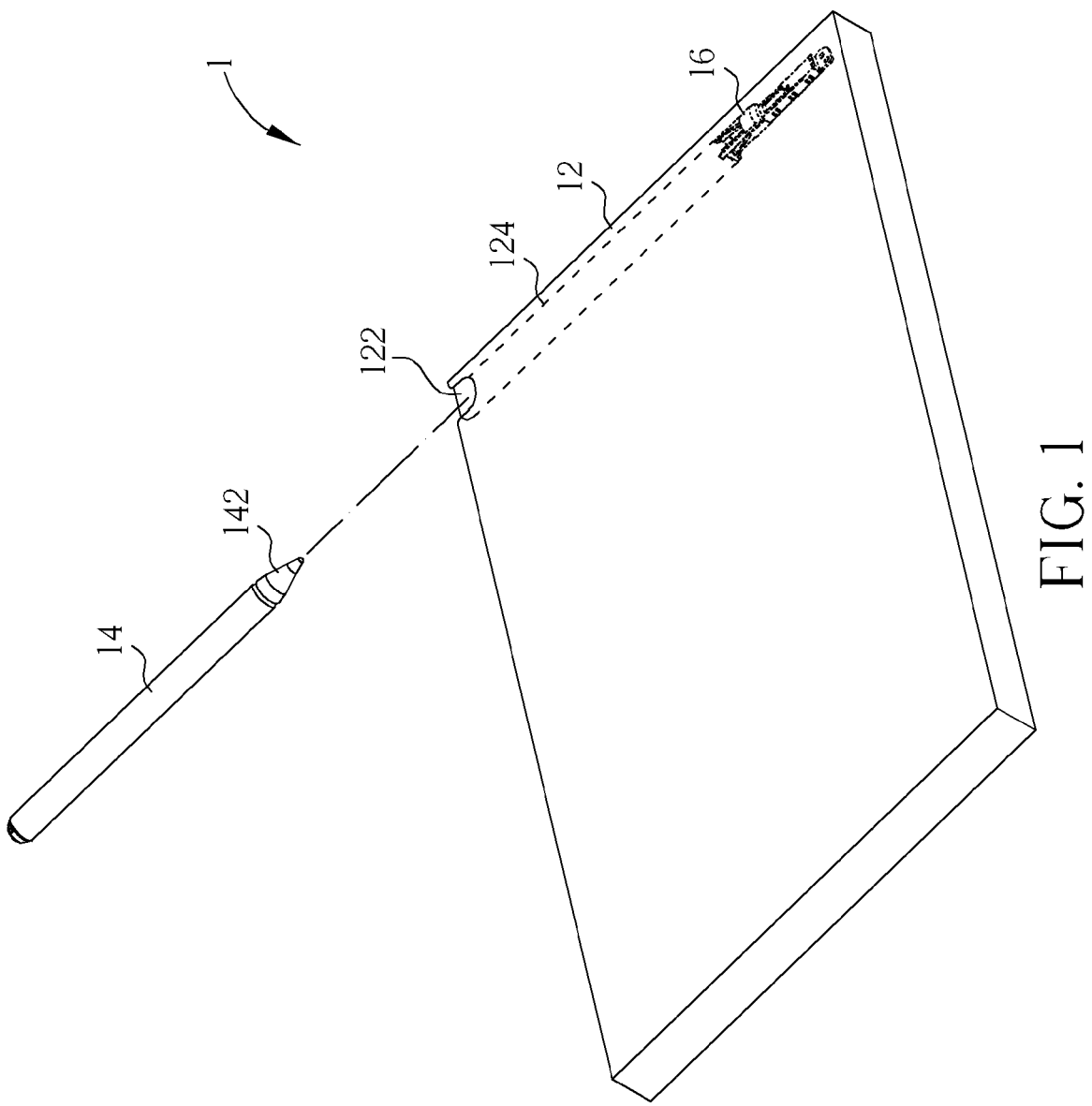
FIG. 1 is a back view of a portable electronic apparatus of a preferred embodiment according to the invention.

Please refer to FIG. 1, which is a back view of a portable electronic apparatus 1 of a preferred embodiment according to the invention. The portable electronic apparatus 1 includes a casing 12, a pencil object 14, and a holding structure 16. The casing 12 has an inlet 122 and a passage 124. The holding structure 16 is disposed in the casing 12. The pencil object 14 has an end portion 142. The pencil object 14 can be inserted into the casing 12 from the inlet 122 to pass through the passage 124 so that the end portion 142 is held by the holding structure 16. In the embodiment, the portable electronic apparatus 1 is a tablet computer, and the pencil object 14 is a touch pen. In a practical application, the portable electronic apparatus 1 can be a personal digital assistant, a smart phone or other portable electronic apparatus, and the pencil object 14 can be any object whose end portion can be held by the holding structure 16. In addition, in practice, the passage 124 may be realized without physical structure; in principle, it is practicable as long as the passage 124 can provide space for the pencil object 14 to pass through. If the passage 124 is realized by physical structure, the stability of the pencil object 14 being inserted into the casing 12 can be enhanced.

Figure 2:
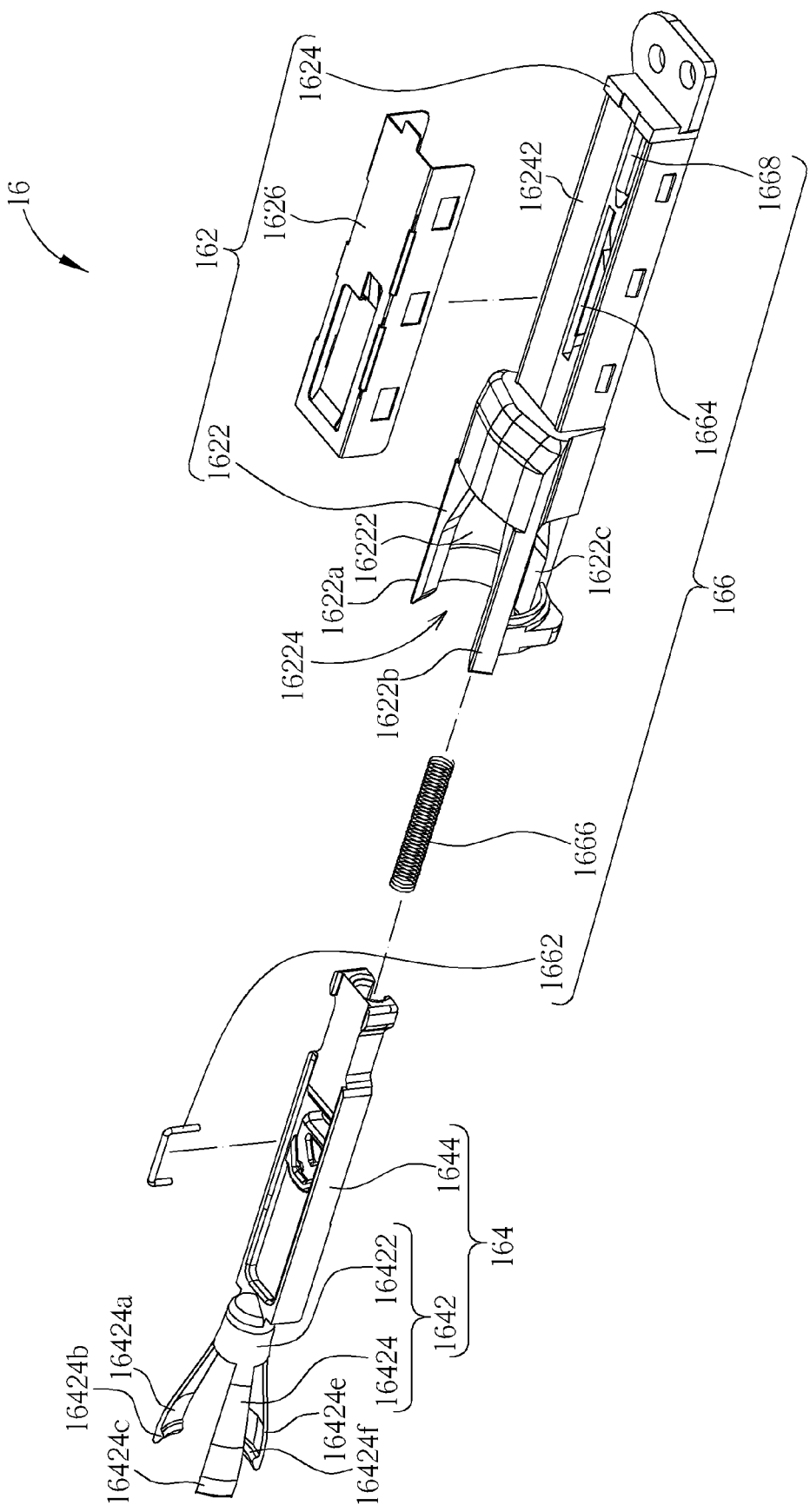
FIG. 2, which is a exploded view of the holding structure of the portable electronic apparatus in FIG. 1.

Please refer to FIG. 2, which is an exploded view of the holding structure 16. The holding structure 16 includes a mount structure 162, a movable member 164, and a push-push mechanism 166. The mount structure 162 includes a constraining portion 1622, an engagement portion 1624 connected to the constraining portion 1622, and a protection cover 1626. The constraining portion 1622 has an accommodating space 16222 and an opening 16224 communicating with the accommodating space 16222. The engagement portion 1624 has a slide 16242. The protection cover 1626 is engaged to the engagement portion 1624 and covers the slide 16242. The movable member 164 includes a carrier 1642 and a sliding portion 1644 of the carrier 1642. The sliding portion 1644 slides in the slide 16242 so that the carrier 1642 can slide in or slide out the accommodating space 16222 from the opening 16224, so as to achieve the result that the movable member 164 can move relative to the mount structure 162. The carrier 1642 includes a push portion 16422 and an engaging structure 16424. The push portion 16422 connects the engaging structure 16424 and the sliding portion 1644. The engaging structure 16424 is used for engaging with the end portion 142 of the pencil object 14.

When the carrier 1642 is accommodated in the accommodating space 16222, the constraining portion 1622 constrains deformation of the engaging structure 16424. In the embodiment, the engaging structure 16424 includes a first flexible claw 16424a, a first protrusion 16424b disposed on the first flexible claw 16424a, a second flexible claw 16424c, a second protrusion 16424d (not shown in FIG. 2, please referring to FIG. 5) disposed on the second flexible claw 16424c, a third flexible claw 16424e, and a third protrusion 16424f disposed on the third flexible claw 16424e. The constraining portion 1622 includes three ribs 1622a, 1622b and 1622c forming the accommodating space 16222 and disposed corresponding to the first flexible claw 16424a, the second flexible claw 16424c, and the third flexible claw 16424e respectively. Thereby, when the carrier 1642 is accommodated in the accommodating space 16222, the ribs 1622a, 1622b and 1622c can urge against the first flexible claw 16424a, the second flexible claw 16424c, and the third flexible claw 16424e respectively so as to constrain the deformation of the engaging structure 16424.

Figure 3:
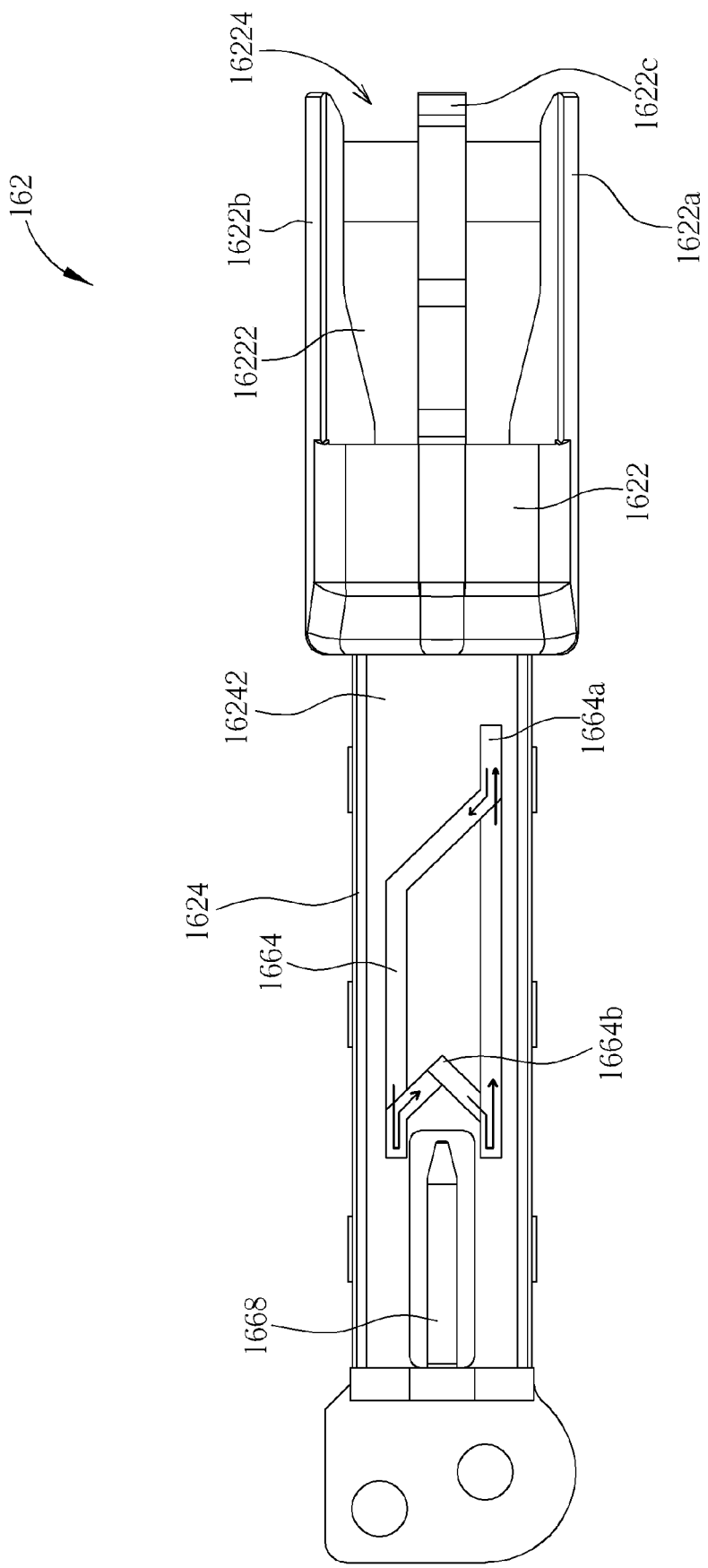
FIG. 3 is a top view of the mount structure of the holding structure in FIG. 2.

Please refer to FIG. 2 and FIG. 3. FIG. 3 is a top view of the mount structure 162. The push-push mechanism 166 includes a guided bar 1662, a guiding and positioning groove 1664, a spring 1666, and a positioning boss 1668. The guiding and positioning groove 1664 is formed in the slide 16242. An end of the guided bar 1662 is pivotally connected to the sliding portion 1644; the other end of the guided bar 1662 is guided to slide in the guiding and positioning groove 1664. The positioning boss 1668 is mounted on the engagement portion 1624. The spring 1666 is sleeved on the positioning boss 1668 and urges against the engagement portion 1624 and the sliding portion 1644 to drive the sliding portion 1644 to move away from the engagement portion 1624. In the embodiment, the guiding and positioning groove 1664 forms a circular path with height differences at the bottom thereof. The path direction thereof is shown by arrows in FIG. 3. Because of elasticity of the spring 1666, the guided bar 1662 can stay at a first position 1664a and a second position 1664b selectively. When the guided bar 1662 stays at the first position 1664a, the carrier 1642 departs from the accommodating space 16222; when the guided bar 1662 stays at the second position 1664b, the carrier 1642 is accommodated in the accommodating space 16222. In practice, the push-push mechanism of the invention is not limited thereto. In principle, any mechanism which can selectively keep the carrier 1642 in the accommodating space 16222 is applicable to the invention. For example, in another embodiment, the carrier 1642 can be held in the accommodating space 16222 by a pin locking the movable member 164.

Figure 4:
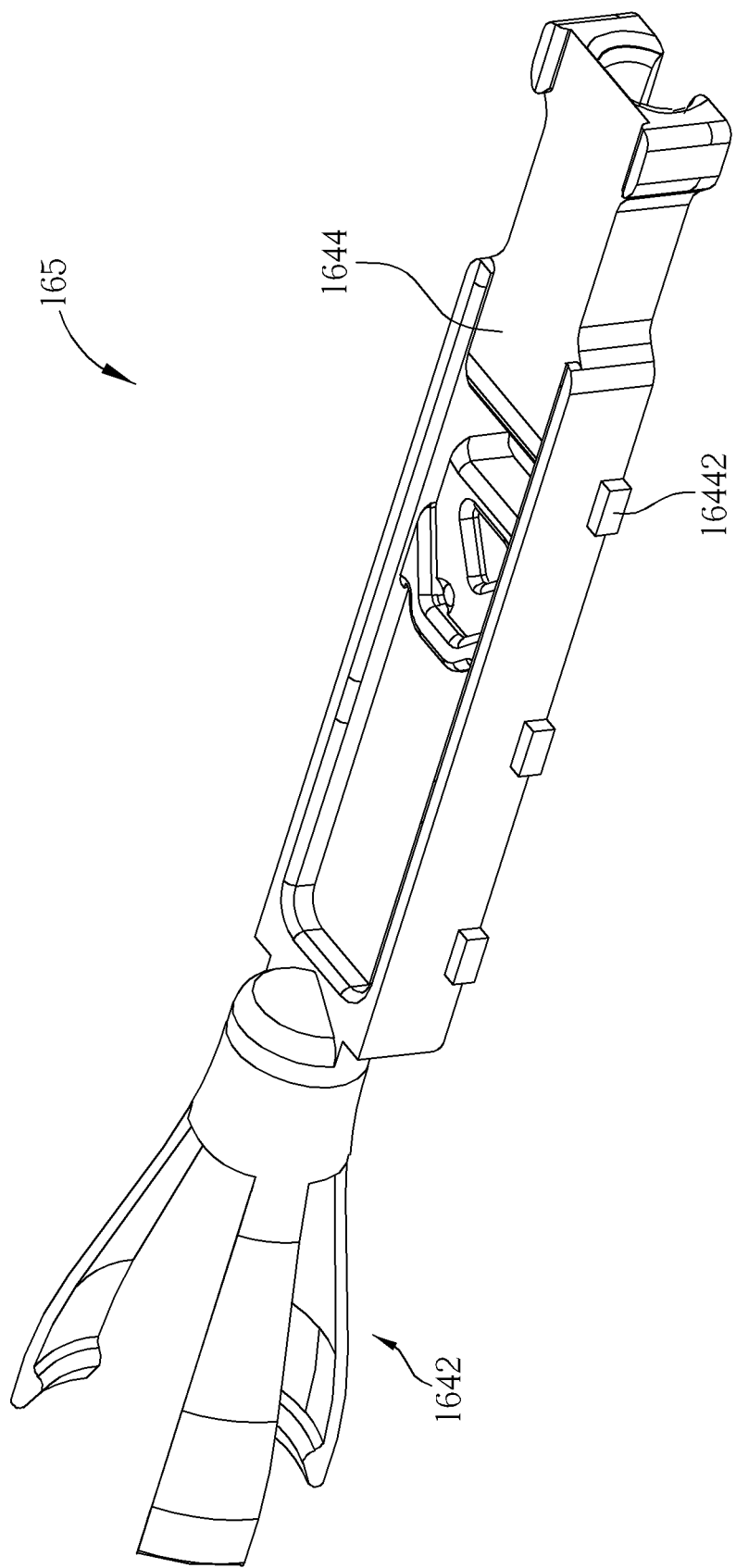
FIG. 4 is a schematic diagram illustrating the movable member according to another embodiment.

It is added that the sliding portion 1644 uses its sidewalls and bottom surface to slide in the slide 16242. In practice, lubricant can be coated on the contact surfaces between the sliding portion 1644 and the slide 16242 for reducing friction therebetween; however, the invention is not limited thereto. Please refer to FIG. 4, which is a schematic diagram illustrating the movable member 165 according to another embodiment. The movable member 165 forms a plurality of protrusive sliders 16442 on opposite sides respectively of the sliding portion 1644. Thereby, the sliding portion 1644 slides on the sidewalls of the slide 16242 by the sliders 16442, so as to reducing the wearing degree of the sliding portion 1644 to extend service life of the movable member 165.

Figure 5:
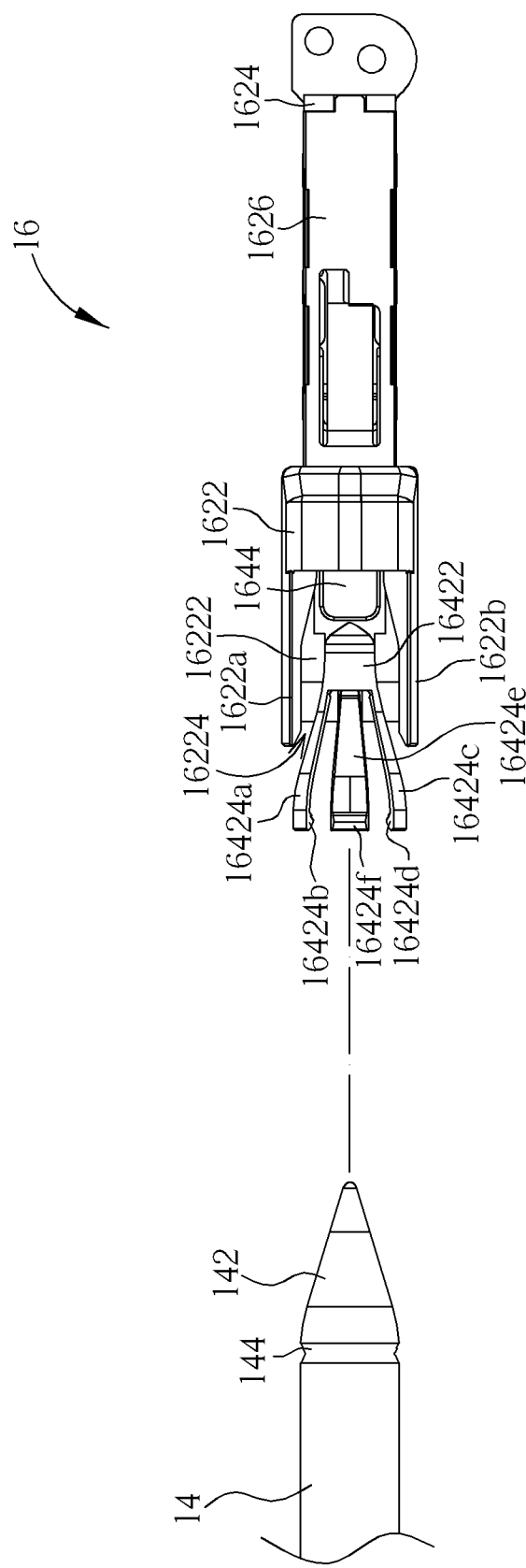
FIG. 5 is a schematic diagram illustrating the pencil object and the holding structure of the portable electronic apparatus in FIG. 1 before being engaged.
Figure 6:
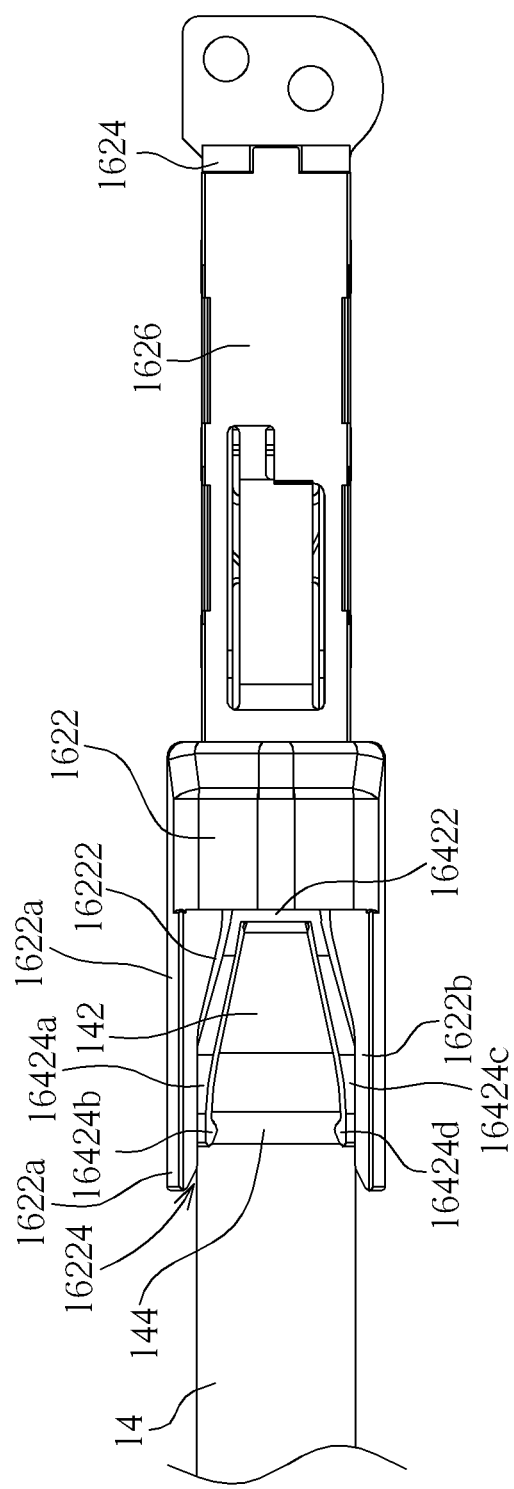
FIG. 6 is a schematic diagram illustrating the pencil object and the holding structure of the portable electronic apparatus in FIG. 1 after being engaged.
Figure 7:
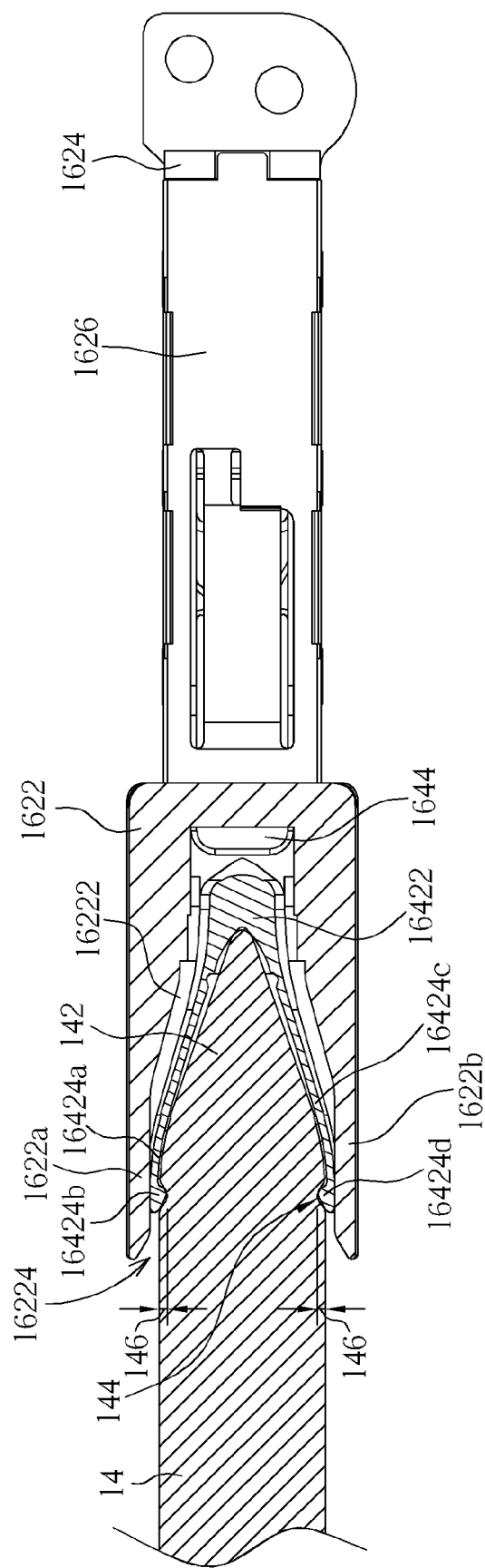
FIG. 7 is a sectional view of the pencil object and the holding structure in FIG. 6.

Please refer to FIG. 2, FIG. 3 and FIGS. 5 through 7. FIG. 5 is a schematic diagram illustrating the pencil object 14 and the holding structure 16 before being engaged. FIG. 6 is a schematic diagram illustrating the pencil object 14 and the holding structure 16 after being engaged. FIG. 7 is a sectional view of the pencil object 14 and the holding structure 16 in FIG. 6. Before the pencil object 14 is inserted into the holding structure 16, the engaging structure 16424 extends out the constraining portion 1622, as shown in FIG. 5. At this moment, the guided bar 1662 stays at the first position 1664*a*. In the embodiment, the engaging structure 16424 is designed in flexible structure. The holding force by the engaging structure 16424 is less at this situation, so a user can easily insert the end portion 142 of the pencil object 14 into the carrier 1642 to push the push portion 16422. In another aspect, the end portion 142 can be extracted from the carrier 1642 at this situation. In practice, the movable member 164 is an injection part and usually is made of the same material. The flexibility of the engaging structure 16424 can be controlled by its thickness. For example, the thinner the thickness is, the larger the flexibility is; i.e. the portion of the engaging structure 16424 is more flexible. Therefore, the holding force only by the engaging structure 16424 on the end portion 142 can be adjusted by modifying the thickness of the flexible claws 16424*a*, 16424*c* and 16424*e* for meeting product requirement. In the embodiment, when the end portion 142 is inserted into the carrier 1642, the engaging structure 16424 is not tightly engaged with the end portion 142. So in practice, the first flexible claw 16424*a*, the second flexible claw 16424*c*, and the third flexible claw 16424*e* in FIG. 5 can be spread more; however, the invention is not limited thereto. For example, when the end portion 142 is inserted into the carrier 1642, the engaging structure 16424 can be designed to provide some holding force on the end portion 142, which is conducive to a later insertion of the pencil object 14.

After the end portion 142 of the pencil object 14 is inserted in the carrier 1642, the user can push the push portion 16422 by the end portion 142 of the pencil object 14 so as to retreat the movable member 164 back into the mount structure 162 until the carrier 1642 is accommodated in the accommodating space 16222 of the constraining portion 1622 from the opening 16224, shown as FIG. 6 and FIG. 7. At this moment, the guided bar 1662 stays at the second position 1664*b*, so the carrier 1642 cannot depart from the accommodating space 16222 and is structurally constrained by the constraining portion 1622. In the embodiment, the pencil object 14 has a groove 144 formed on the surface of the end portion 142. When the carrier 1642 is accommodated in the accommodating space 16222, the first protrusion 16424*b*, the second protrusion 16424*d*, and the third protrusion 16424*f* are wedged into the groove 144 so that the engagement strength between the engaging structure 16424 and the end portion 142 is enhanced. In addition, in the embodiment, the groove 144 is a circular groove, so the engagement for the end portion 142 and the engaging structure 16424 is non-directional, which is convenient for the insertion by the user; however, the invention is not limited thereto. If the user wants to extract the pencil object 14, the user needs to push the push portion 16422 by the end portion 142 of the pencil object 14 again so that the guided bar 1662 can slide along the guiding and positioning groove 1664 to stay at the first position 1664*a* again. At this moment, the carrier 1642 departs from the accommodating space 16222 from the opening 16224. The engaging structure 16424 is disengaged from the end portion 142. The user therefore can take the pencil object 14 out easily.

As shown in FIG. 7, when the carrier 1642 is accommodated in the accommodating space 16222, the ribs 1622*a*, 1622*b* and 1622*c* of the constraining portion 1622 can resist the deformation of the first flexible claw 16424*a*, the second flexible claw 16424*c*, and the third flexible claw 16424*e* so that the engaging structure 16424 can be engaged with the end portion 142 effectively. Therein the depth 146 of the first protrusion 16424*b*, the second protrusion 16424*d* and the third protrusion 16424*f* being wedged into the groove 144 is the interference for the end portion 142 to depart from the engaging structure 16424. In other words, the user needs to apply a certain force to overcome the above interference so as to depart the end portion 142 from the engaging structure 16424. In the embodiment, the first flexible claw 16424*a*, the second flexible claw 16424*c*, and the third flexible claw 16424*e* do not provide holding force directly, so the force for overcoming the above interference depends mainly on the structure strength of the constraining portion 1622. In practical product design, the structure strength of the constraining portion 1622 can be designed to be with some flexibility, so that the extraction on the end portion 142 is difficult but the structure is undamaged. In addition, in the embodiment, the profile of the accommodating space 16222 matches the profile of the end portion 142, so the constraining portion 1622 can support and constrain the carrier 1642 more stable. However, the invention is not limited thereto.

It is added that in practice, the forced extraction on the end portion 142 may occur when the extraction force is larger than the strength of the positioning structure of the push-push mechanism 166. At this case, the end portion 142 is still located in the constraining portion 1622 and engaged with the engaging structure 16424. The end portion 142 together with the engaging structure 16424 depart from the accommodating space 16222. So in principle, it is unnecessary to overcome the above interference. However, the end portion 142 tends to spread the first flexible claw 16424*a*, the second flexible claw 16424*c*, and the third flexible claw 16424*e* during the forced extraction, so the ribs 1622*a*, 1622*b* and 1622*c* apply friction force on the engaging structure 16424, which indirectly resists the forced extraction on the end portion 142. Forces for normally inserting and extracting the pencil object 14 are substantially the same, i.e. to overcome the elastic force by the spring 1666. For a practical product, the force magnitude for normally inserting and extracting can be set to below 450 gw; the force magnitude for the forced extraction can be set to above 1200 gw. These set values can make the user easily insert or extract the pencil object 14 and also can use a quite large force magnitude for the forced extraction to avoid the pencil object 14 from being extracted unexpectedly, for example due to the portable electronic apparatus 1 vibrating, unexpected hooking the pencil object 14, a baby hooking the pencil object 14 and so on.

Figure 8:
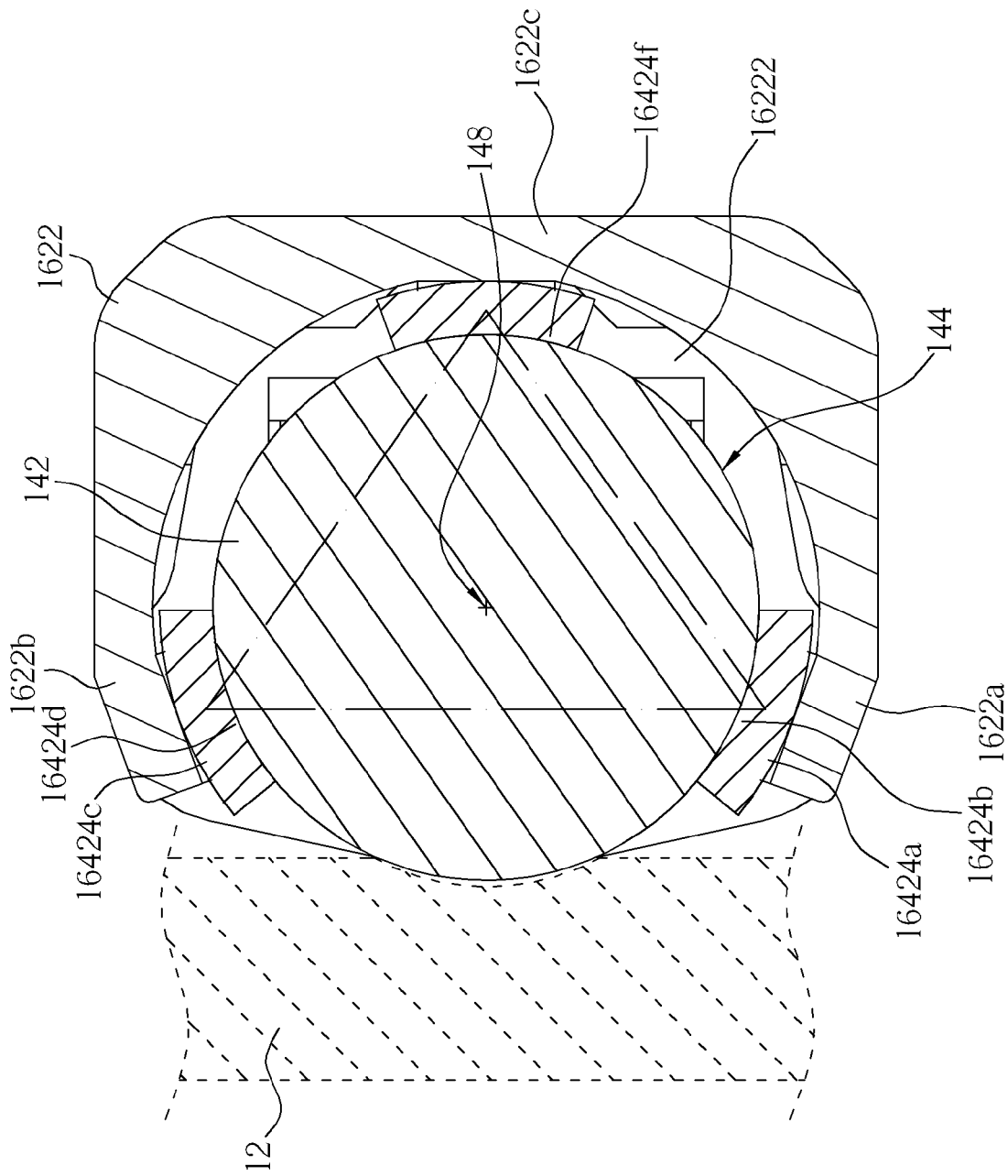
FIG. 8 is another sectional view of the pencil object and the holding structure in FIG. 6.

Please refer to FIG. 8, which is another sectional view of the pencil object 14 and the holding structure 16 in FIG. 6. The cross section of the pencil object 14 passes through the groove 144. In the embodiment, the geometric center 148 (shown by a cross mark in FIG. 8) of the cross section is located within an area (shown by a chain line) enclosed by the first protrusion 16424*b*, the second protrusion 16424*d*, and the third protrusion 15424*f*; that is, the first protrusion 16424*b*, the second protrusion 16424*d*, and the third protrusion 16424*f* can hold the end portion 142 effectively. However, the invention is not limited thereto. Furthermore, the holding structure 16 can be disposed to coordinate with the inner wall of the casing 12 opposite to the third protrusion 16424*f* for further enhancing the holding effect on the pencil object 14 by the holding structure 16.

Figure 9:
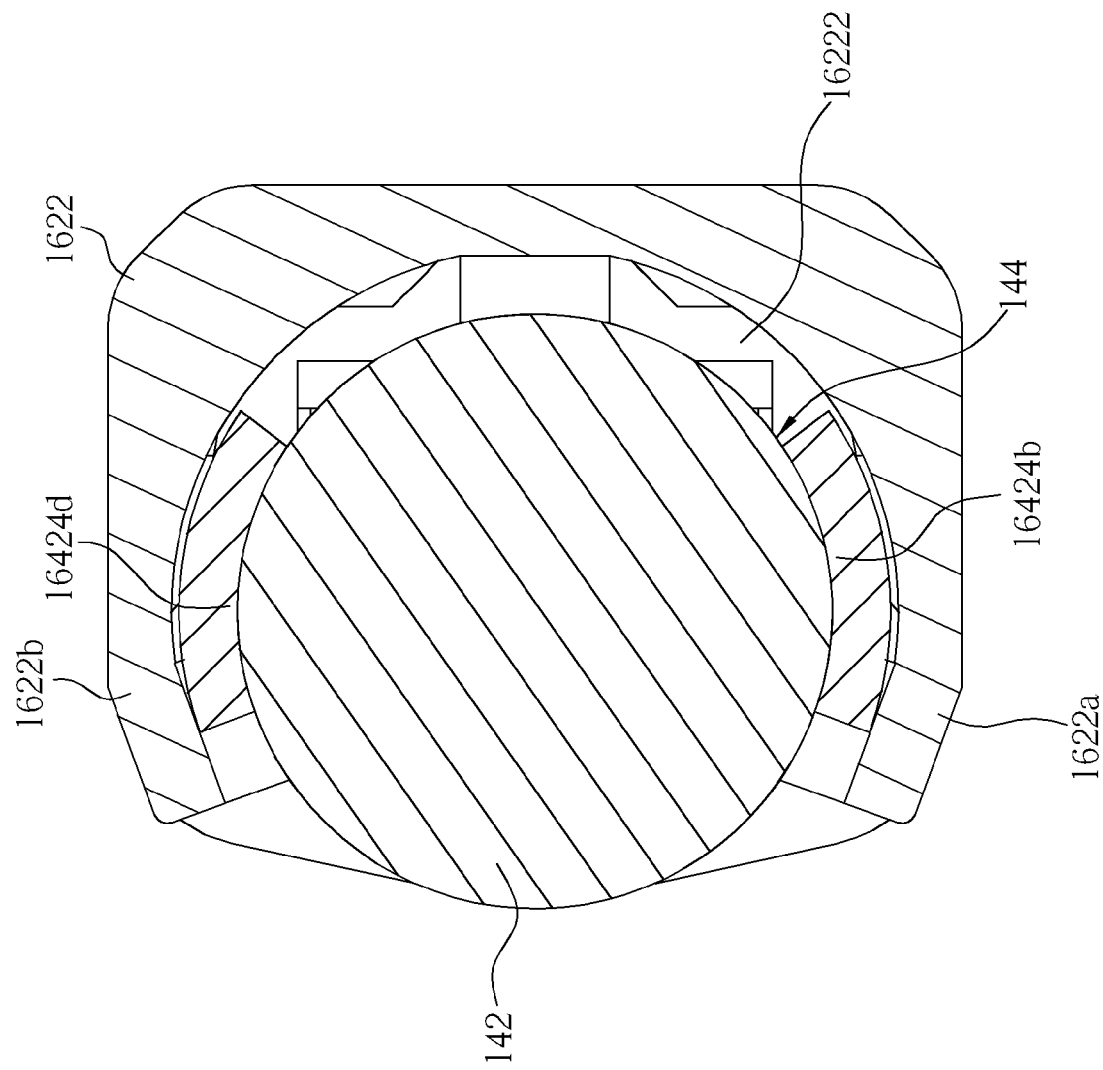
FIG. 9 is a sectional view of the pencil object engaged with the holding structure according to another embodiment.

In the above embodiment, the holding structure 16 holds the end portion 142 by three flexible claws to; however, the invention is not limited thereto. Please refer to FIG. 9, which is a sectional view of the pencil object 14 engaged with the holding structure according to another embodiment. The position for the sectional view is equal to that for FIG. 8. The holding structure in FIG. 9 is similar to the holding structure 16 in structure. The main difference is that the holding structure in FIG. 9 only uses the first flexible claw 16424*a* and the second flexible claw 16424*c* disposed oppositely, so when the end portion 142 of the pencil object 14 is accommodated in the accommodating space 16222, the first protrusion 16424*b* and the second protrusion 16424*d* are wedged into the groove 144 oppositely. Because the first protrusion 16424*b* and the second protrusion 16424*d* are disposed symmetrically, the holding structure in FIG. 9 also can provide symmetrical and stable holding force on the end portion 142.

Figure 10:
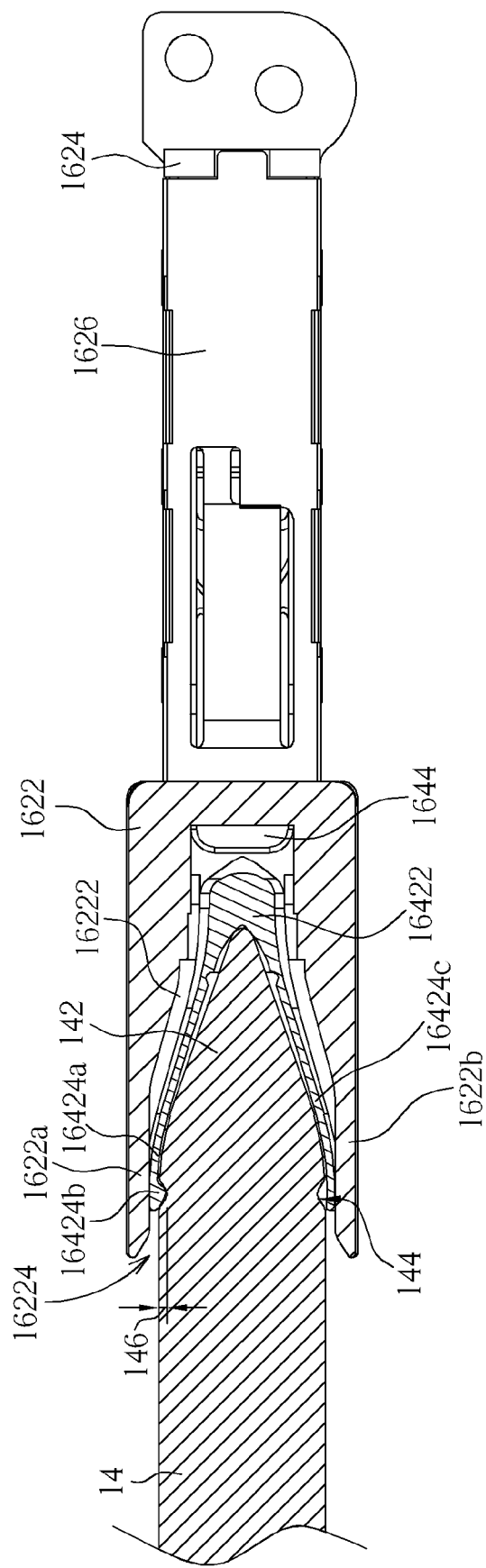
FIG. 10 is a sectional view of the pencil object engaged with the holding structure according to another embodiment.

Please refer to FIG. 10, which is a sectional view of the pencil object 14 engaged with the holding structure according to another embodiment. The difference between the holding structure in FIG. 10 and the holding structure 16 is that only the first flexible claw 16424*a* of the holding structure in FIG. 10 thereon disposes the first protrusion 16424*b*. Therefore, if the user wants to force the pencil object 14 to be extracted, the user only needs to overcome the interference (i.e. the depth 146) between the first protrusion 16424*b* and the pencil object 14. Under the same condition, the extraction force is smaller than that for the holding structure 16; however, the holding structure in FIG. 10 still has the function of preventing the pencil object 14 from being extracted unexpectedly. Other related descriptions about the forced extraction mechanism refer to the above-mentioned descriptions about the holding structure 16 and are not described here. Further, the above embodiments are based on the fact of using the interference induced by wedging the holding structure into the end portion 142 to resist the forced extraction by the user. Based on the similar anti-extraction mechanism, in practice, the engaging structure of the invention can include only a single flexible claw thereon disposing a protrusion, for example the engaging structure including only the first flexible claw 16424*a* and the first protrusion 16424*b*. When the end portion 142 is accommodated in the accommodating space 16222, the single flexible claw still can use the protrusion thereon to be engaged with the end portion 142. The end portion 142 is therefore held by the single flexible claw and the constraining portion 1622. At this moment, if the user wants to force the end portion 142 to be extracted, the user also needs to overcome the interference between the protrusion of the single flexible claw and the end portion 142.

Figure 11:
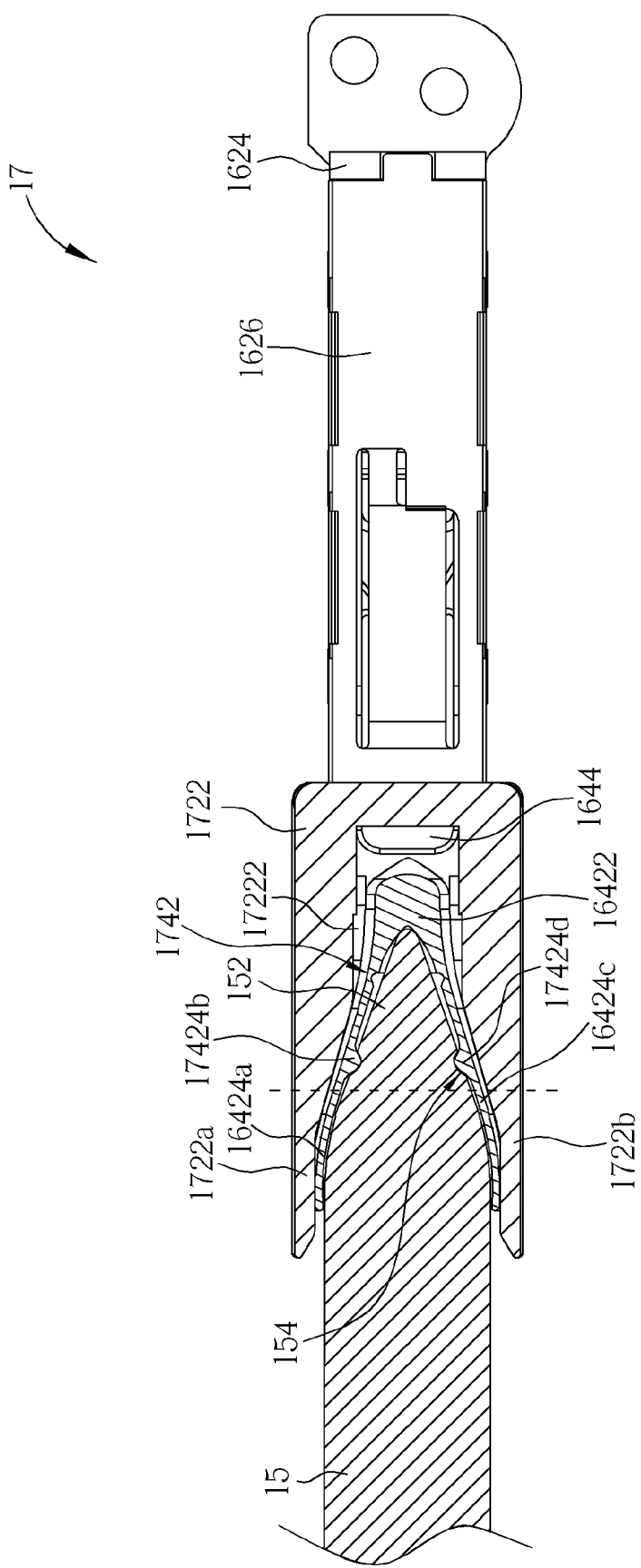
FIG. 11 is a sectional view of the pencil object engaged with the holding structure according to another embodiment.

Please refer to FIG. 2. Take the first flexible claw 16424*a* as example. The first flexible claw 16424*a* has a free end. The first protrusion 16424*b* is formed at the free end. Such design is conducive to the other portion of the first flexible claw 16424*a* stabilizing the holding on the end portion 142. The above description is also applied to the second flexible claw 16424*c* and the third flexible claw 16424*e* and is not repeated therefor. However, the invention is not limited thereto. Please refer to FIG. 11, which is a sectional view of the pencil object 15 engaged with the holding structure 17 according to another embodiment. The holding structure 17 is substantially similar to the holding structure 16 in structure. The main difference is that the constraining portion 1722 of the holding structure 17 is modified for matching the carrier 1742 of the holding structure 17, such that when the carrier 1742 is accommodated in the accommodating space 17222, the constraining portion 1722 can stably support the carrier 1742 especially to resist the portions of the first flexible claw 16424*a* and the second flexible claw 16424*c* corresponding to the first protrusion 17424*b* and the second protrusion 17424*d* respectively. At this moment, the first protrusion 17424*b* and the second protrusion 17424*d* are wedged into the groove 154 of the end portion 152 of the pencil object 15. Therefore, the carrier 1742 also can hold the end portion 152 effectively. In the structure of the holding structure 17, the above description is also applied to the third flexible claw and the third protrusion formed thereon (not shown in FIG. 11) and is not repeated therefor. In the embodiment, the first protrusion 17424*b* and the second protrusion 17424*d* are not disposed at the free ends of the first flexible claw 16424*a* and the second flexible claw 16424*c* respectively, but the first protrusion 17424*b* and the second protrusion 17424*d* are still capable of being wedged into the groove 154. The free ends of the first flexible claw 16424*a* and the second flexible claw 16424*c* still can coordinate with the ribs 1722*a* and 1722*b* of the constraining portion 1722 to assist in the holding on the end portion 152. In practice, if the holding structure 17 is designed under a dimensional constraint, the portion of the holding structure 17 at the left side of the dashed line in FIG. 11 can be eliminated for shortening the total length of the holding structure 17 without excessive influence on the holding function of the carrier 1742. In addition, in practice, the disposition of the groove 154 of the end portion 152 can be close to the tip of the end portion 142; the protrusions 17424*b* and 17424*d* are correspondingly disposed. The pencil object 15 can still be stably held.

Figure 12:
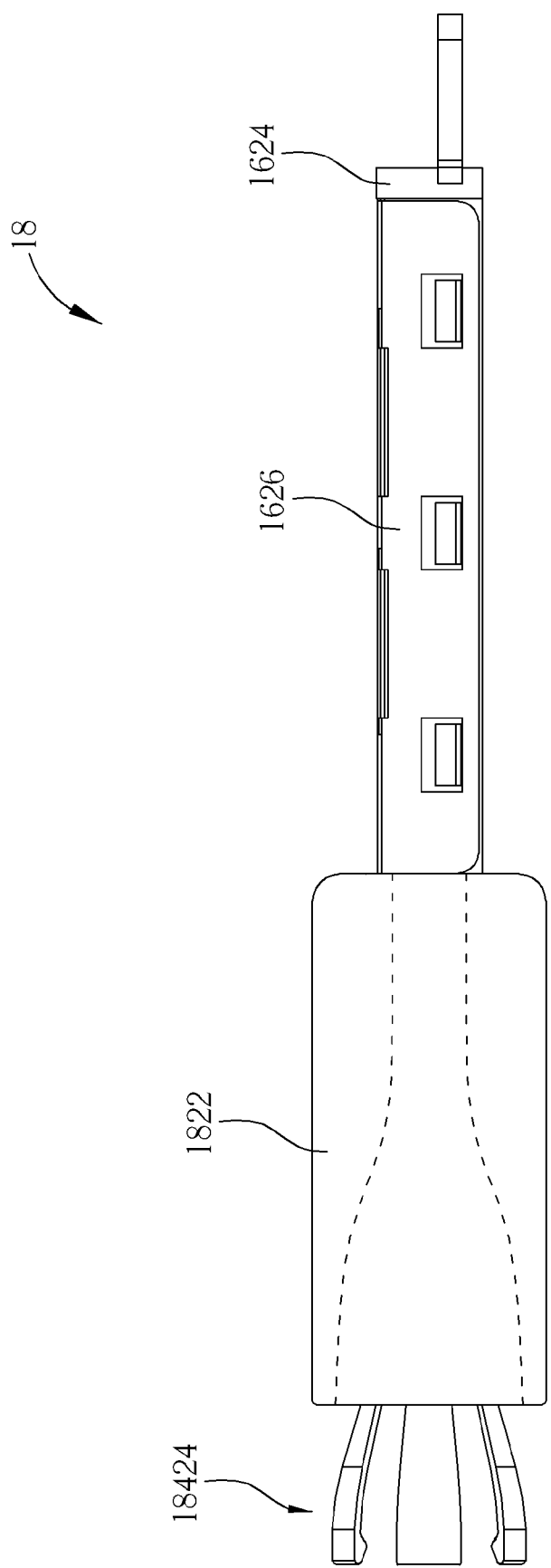
FIG. 12 is a side view of the holding structure according to another embodiment.

In the above embodiments, the constraining portions 1622 and 1722 are formed in rib structure, but the invention is not limited thereto. Please refer FIG. 12, which is a side view of the holding structure 18 according to another embodiment. The holding structure 18 and the holding structure 16 are substantially similar in structure. The main difference is that the constraining portion 1822 of the holding structure 18 is formed in a tubular structure. The inner structure of the tubular structure is shown substantially by dashed lines. The constraining portion 1822 can provide more complete structural supporting to the engaging structure 18424 by use of the tubular structure. In such design, the quantity and disposition of the claws of the engaging structure 18424 can be more flexible to provide more stable holding structure, for example two claws, four claws, five claws or more. However, the invention is not limited thereto.

Figure 13:
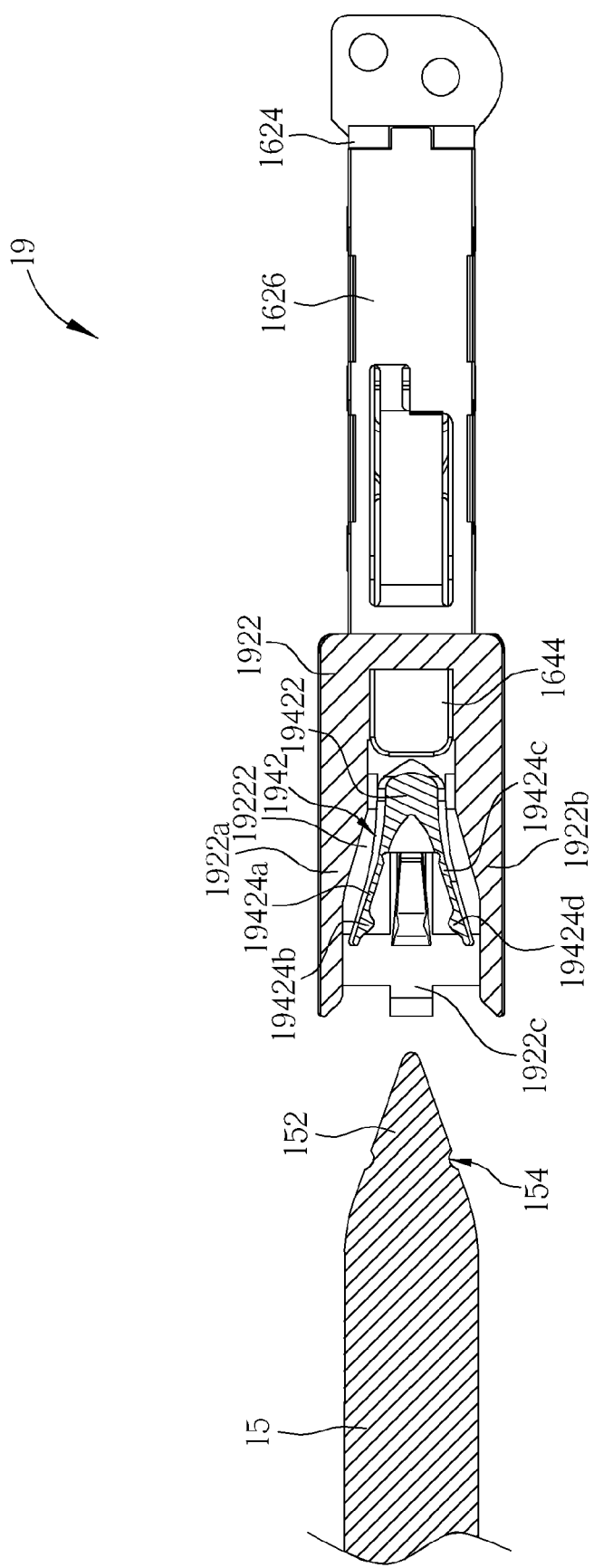
FIG. 13 is a sectional view of the pencil object and the holding structure before being engaged according to another embodiment.
Figure 14:
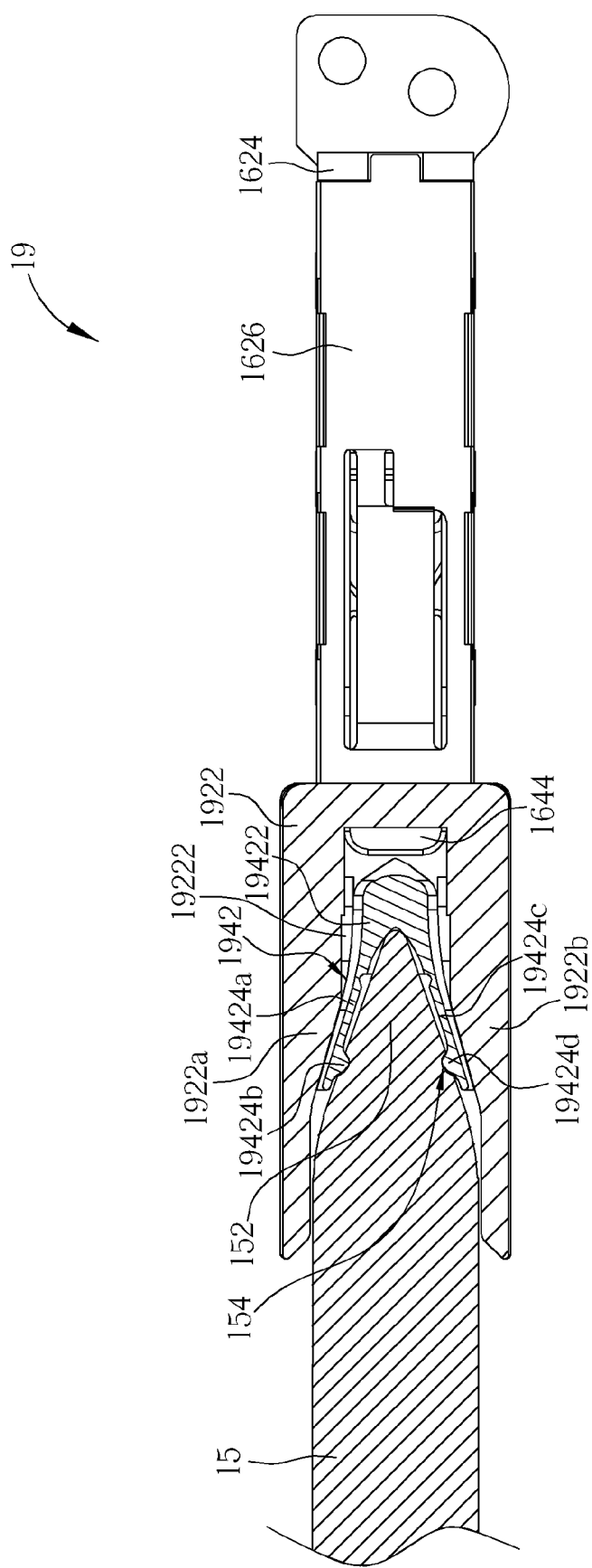
FIG. 14 is a sectional view of the pencil object engaged with the holding structure in FIG. 13.

Furthermore, for holding structures 16, 17 and 18 in the above embodiments, the engagement and disengagement of the pencil objects 14 and 15 and the carriers 1642 and 1742 are performed out the constraining portions 1622 and 1722 after the carriers 1642 and 1742 extends out the constraining portions 1622 and 1722; however, the invention is not limited thereto. Please refer FIG. 13 and FIG. 14. FIG. 13 is a sectional view of the pencil object 15 and the holding structure 19 before being engaged according to another embodiment. FIG. 14 is a sectional view of the pencil object 15 engaged with the holding structure 19 in FIG. 13. The holding structure 19 and the holding structure 17 are substantially similar in structure. The main difference is that it is unnecessary to extend the carrier 1942 of the holding structure 19 out the constraining portion 1922 for performing the engagement and disengagement of the end portion 152 of the pencil object 15. Therefore, the required action space for the holding structure 19 can be smaller than that for the holding structures 16, 17 and 18. The design for the holding structure 19 is conducive to assembly flexibility. In the embodiment, the length of the flexible claws 19424*a*, 19424*c* and 19424*e* of the carrier 1942 is shorter than the length of the flexible claws 16424*a*, 16424*c* and 16424*e*. The protrusions 19424*b*, 19424*d* and 19424*f* of the carrier 1942 are still disposed close to the free ends of the flexible claws 19424*a*, 19424*c* and 19424*e*. The length of ribs 1922*a*, 1922*b* and 1922*c* of the constraining portion 1922 is longer that the length of the flexible claws 19424a, 19424c and 19424e. Therefore, when the end portion 152 is structurally constrained by the carrier 1942 together with the constraining portion 1922 so as to be held, the pencil object 15 has some portion which does not contact the flexible claws 19424a, 19424c and 19424e and is disposed in the accommodating space 19222. At this moment, the ribs 1922a, 1922b and 1922c can assist in structurally constraining the pencil object 15. In practice, the profile of the ribs 1922a, 1922b and 1922c matches the profile of the pencil object 15 so as to enhance the effect of assisting constraining. Furthermore, in the embodiment, during the insertion of the pencil object 15, the pencil object 15 is constrained by the ribs 1922a, 1922b and 1922c and then contacts the carrier 1942. Because the structure strength of the ribs 1922a, 1922b and 1922c is higher than that of the flexible claws 19424a, 19424c and 19424e, the structural constraint by the ribs 1922a, 1922b and 1922c can guide the insertion of the pencil object 15 so that the operation of holding the pencil object 15 is more smooth.

It is additionally added that the above embodiments are based on the fact that the holding structure is an independent device; however, the invention is not limited thereto. In practice, a partial structure of the holding structure can be integrated into the structure of the casing of the portable electronic apparatus. For example, the constraining portion or the mount structure can be formed integrated with the casing; that is, the constraining portion can be formed directly by the inner wall of the casing, which also realizes the function of the constraining portion constraining the deformation of the engaging structure.

As discussed above, the invention uses the constraining portion to constrain the deformation of the engaging structure to provide stable holding force without metal spring, which avoids the problem in the prior art that the holding force by the metal spring decays because of the elasticity fatigue of the metal spring. Furthermore, the invention provides flexibility in designing the holding force quite different to the forces of extraction and insertion by the property that the engaging structure and the end portion are disengaged when the carrier is not located in the accommodating space, which avoids the object held by the holding structure from being disengaged unexpectedly, so as to meet actual requirements better.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A holding structure for holding an end portion of an object, the holding structure comprising:
   a mount structure comprising a constraining portion, the constraining portion having an accommodating space and an opening communicating with the accommodating space, the constraining portion comprising three ribs formed in the accommodating space; and
   a movable member capable of moving relative to the mount structure, the movable member comprising a carrier, the carrier comprising an engaging structure for being engaged with the end portion, the engaging structure comprising a first flexible claw, a first protrusion disposed on the first flexible claw, a second flexible claw, a second protrusion disposed on the second flexible claw, a third flexible claw, and a third protrusion disposed on the third flexible claw, the three ribs being disposed corresponding to the first flexible claw, the second flexible claw, and the third flexible claw respectively so as to be against the first flexible claw, the second flexible claw, and the third flexible claw when the carrier is accommodated in the accommodating space, wherein when the end portion is inserted into the constraining portion from the opening to be accommodated together with the carrier in the accommodating space, the constraining portion constrains deformation of the engaging structure such that the engaging structure is engaged with the end portion, the first protrusion, the second protrusion and the third protrusion are wedged in a groove formed on a surface of the end portion, and a geometric center of a cross section of the end portion passing through the groove is located within an area enclosed by the first protrusion, the second protrusion, and the third protrusion, and when the carrier departs from the accommodating space, the engaging structure and the end portion are disengaged.

2. The holding structure of claim 1, wherein the first flexible claw has a free end, and the first protrusion is formed on the free end.

3. The holding structure of claim 1, wherein the carrier comprises a push portion connected to the first flexible claw, and the push portion is capable of being pushed by the end portion to move the movable member toward the mount structure.

4. The holding structure of claim 1, wherein the constraining portion is a tubular structure.

5. The holding structure of claim 1, wherein a profile of the accommodating space matches with a profile of the end portion.

6. The holding structure of claim 1, wherein the mount structure comprises an engagement portion connected to the constraining portion, the engagement portion has a slide, the movable member comprises a sliding portion connected to the carrier, and the sliding portion slides in the slide so that the carrier is capable of sliding in or sliding out the accommodating space from the opening.

7. The holding structure of claim 6, wherein the sliding portion comprises a plurality of protrusive sliders at two opposite sides thereof for sliding on sidewalls of the slide.

8. The holding structure of claim 6, further comprising a push-push mechanism disposed on the engagement portion and the sliding portion so that the carrier is capable of staying in the accommodating space.

9. A portable electronic apparatus with holding structure, comprising:
   a casing having an inlet;
   a pencil object having an end portion, a groove being formed on a surface of the end portion; and
   a holding structure disposed in the casing, the pencil object being capable of being inserted into the casing from the inlet so that the end portion is held by the holding structure, the holding structure comprising:
      a mount structure comprising a constraining portion, the constraining portion having an accommodating space and an opening communicating with the accommodating space, the constraining portion comprises three ribs formed in the accommodating space; and
      a movable member capable of moving relative to the mount structure, the movable member comprising a carrier, the carrier comprising an engaging structure for being engaged with the end portion, the engaging structure comprising a first flexible claw, a first protrusion disposed on the first flexible claw, a second flexible claw, a second protrusion disposed on the second flexible claw, a third flexible claw, and a third protrusion disposed on the third flexible claw, the three ribs being disposed corresponding to the first flexible claw, the second flexible claw, and the third flexible claw respectively so as to be against the first flexible claw, the second flexible claw, and the third flexible claw when the carrier is accommodated in the accommodating space, wherein when the end portion is inserted into the constraining portion from the opening to be accommodated together with the carrier in the accommodating space, the constraining portion constrains deformation of the engaging structure such that the engaging structure is engaged with the end portion, the first protrusion, the second protrusion and the third protrusion are wedged in the groove, and a geometric center of a cross section of the end portion passing through the groove is located within an area enclosed by the first protrusion, the second protrusion, and the third protrusion, and when the carrier departs from the accommodating space, the engaging structure and the end portion are disengaged.

10. The portable electronic apparatus of claim 9, wherein the constraining portion is a tubular structure.

11. The portable electronic apparatus of claim 9, wherein the mount structure comprises an engagement portion connected to the constraining portion, the engagement portion has a slide, the movable member comprises a sliding portion connected to the carrier, and the sliding portion slides in the slide so that the carrier is capable of sliding in or sliding out the accommodating space from the opening.

12. The portable electronic apparatus of claim 11, further comprising a push-push mechanism disposed on the engagement portion and the sliding portion so that the carrier is capable of staying in the accommodating space.

* * * * *